Dec. 5, 1961 F. G. KIRBY 3,011,478
SAFETY FASTENING
Filed April 22, 1960

INVENTOR.
FREDERICK G. KIRBY
BY
Elliott & Pastoriza
ATTORNEYS 3,011,478
SAFETY FASTENING
Frederick G. Kirby, Malibu, Calif., assignor to Kirko Corporation, a corporation of California
Filed Apr. 22, 1960, Ser. No. 24,136
3 Claims. (Cl. 119—106)

This invention relates generally to safety devices and more particularly to an improved safety fastening in the form of a collar or belt adapted to pass about a portion of a body and release only when a predetermined force is exceeded.

While the invention is adaptable to many different types of safety fastenings, its preferred application is in dog collars and for purposes of describing a preferred embodiment of the invention, its use in conjunction with a dog collar will be set forth. It should be borne in mind however that the principles are applicable to other devices such as safety belts for human beings.

In conventional dog collars, there always exists the possibility of the dog strangling himself by having the collar hang up on a picket fence or similar structure. It is therefore desirable to provide a break away or releasable type collar which, when a given tension force in the collar itself is exceeded, will separate to free the dog.

With the foregoing in mind, it is a primary object of this invention to provide an improved safety fastening means which will separate or release when a predetermined tension is exceeded.

More particularly, it is an object to provide a safety fastening device which may be employed as a conventional dog collar for use with a leash.

Another important object is to provide an improved safety collar including means for providing a choke collar when employed with a leash.

Still another important object is to provide an improved safety fastening which may be adjusted to separate under a desired predetermined force and which may also be readily coupled together without requiring any special tools or application of specially directed forces.

Briefly, these and many other objects and advantages of this invention are attained by providing a fastening means in the form of a flexible line or member preferably nonextensible such as a leather band, chain, or similar structure. The ends of the flexible line terminate in suitable coupling means arranged to be inter-connected in such a manner that upon application of a tension force in the line exceeding a predetermined force, the coupling means will separate to free the ends.

In the preferred embodiment of the invention, the coupling means is such that one end portion of the line may be passed through a portion of the coupling means itself to provide a choke-collar arrangement. As a consequence, the fastening device serves the dual function of supporting conventional identification tags for a dog or other person with the safety break feature to prevent harm to the user, and also as a conventional choke collar for use with a leash.

A better understanding of the invention will be had by referring to the accompanying drawings illustrating the preferred embodiment thereof, in which.

Figure 1:
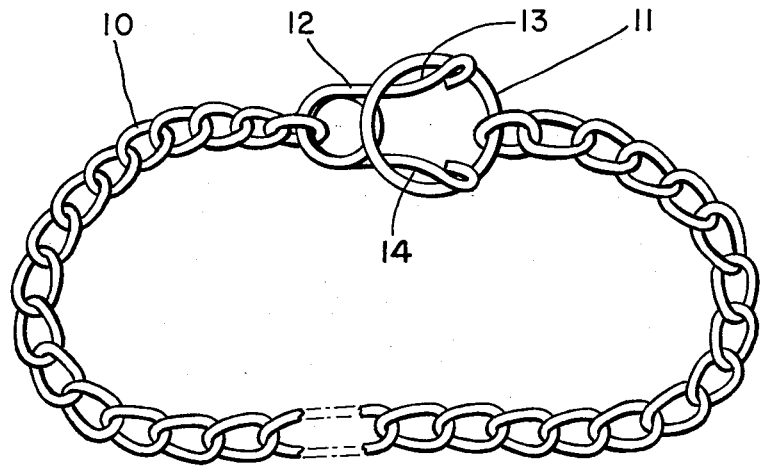
FIGURE 1 is an over-all view of a dog collar employing the safety fastening of this invention.

Referring first to FIGURE 1, there is shown a flexible means in the form of a chain-type collar 10. While a chain has been shown for illustrative purposes, it will be understood that any substantially non-extensible means such as a leather line or equivalent flexible structure could be employed. As shown, the ends of the flexible line 10 terminate respectively in first and second coupling means.

The first coupling means preferably comprises a closed ring 11 of given internal diameter. The second coupling means comprises an elastically deformable member in the form of a rod having its intermediate portion shaped into a spiral 12 and its ends extending substantially tangentially from circumferentially spaced points of the spiral and diverging from each other to define arms 13 and 14. With this arrangement, the arms 13 and 14 may be biased towards each other to decrease their separation to a distance less than the internal diameter of the ring 11 without exceeding the elastic limit of the spiral. The arms 13 and 14 can then be passed through the ring 11 and released to couple the ends of the chain 10 together.

Figure 2:
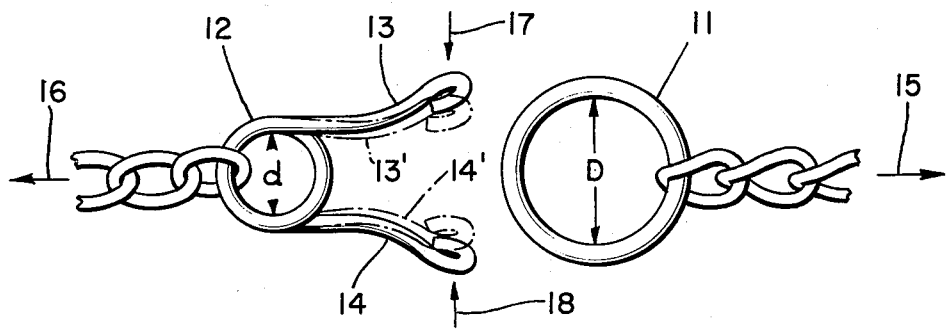
FIGURE 2 is an enlarged fragmentary view of the safety fastening of FIGURE 1 in separated position; and, FIGURE 3 illustrates how the collar may be employed as a choke collar.

In FIGURE 2, the first and second coupling means are shown separated. It will be noted that when the ends of the arms 13 and 14 are forced toward each other to decrease their separation distance, the device will be distorted to the dotted line positions illustrated at 13' and 14'. In such position, the arms can pass through the ring 11.

When a tension force of given magnitude is applied in the chain 10 tending to separate the first and second coupling means as indicated by the arrows 15 and 16, inner diametrically opposite portions of the ring 11 will cam the ends of the arms 13 and 14 towards each other as indicated by the arrows 17 and 18, to the dotted line position. In the dotted line position, the arms can slide back through the ring to release the chain.

Thus, depending upon the stiffness of the spiral portion 12, a given force will be required to separate the ends. This force is determined such that it is less than the force which might harm a dog if the collar held.

By making the diameter $d$ of the spiral portion 12 less than the internal diameter $D$ of the ring 11, the second coupling may be threaded through the ring by first inserting one arm such as the arm 13 through the ring and rotating the second coupling about the axis of the spiral 12 so that the spiral 12 followed by the second arm 14 will pass through the ring. Thus, no manual deformation of the arms is required to simply couple the device. Under the action of tension forces, however, the arms will assume the position relative to the ring as shown in FIGURE 1 and thus separation can only occur when the predetermined force necessary to bias the arms into the dotted line position is present.

Figure 3:
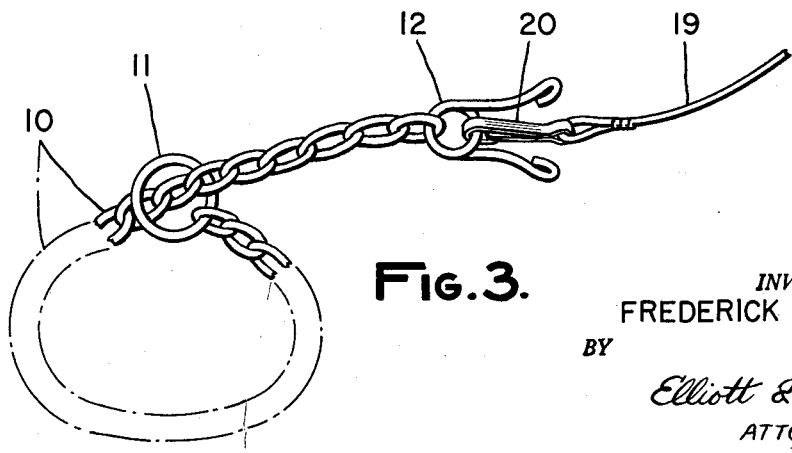

To employ the collar with a conventional leash, the spiral 12 may be pulled through the ring as indicated in FIGURE 3 and a conventional leash terminating in a clip 20 secured to the spiral portion. When used in this manner, it will be evident that the collar serves as a choke collar. If desired, however, the device may be coupled as shown in FIGURE 1 and the leash clip 20 simply secured to the ring 11 so that the dog may be walked without the choking action. In the former case, when the dog is walked with a leash or if the leash is tied to a stake, the break-away feature will function to avoid injury to the dog should unexpected forces be exerted on the leash.

The necessary force for separating the ends can be adjusted by adjusting the initial set position of the arms 13 and 14 with respect to each other and with respect to the internal diameter $D$ of the ring 11.

As mentioned heretofore, the principles of the invention are applicable to many devices in addition to dog collars. For example, when employed in a conventional safety belt, the coupling could be made to separate only when a predetermined force, which would normally cause damage to the wearer if the belt did not release, is exceeded. The belt would then operate to hold the passenger within safety limits but should the force of a crash or other catastrophe exceed those which would cause the belt to injure the user, the device will release.

From the foregoing description, it will be evident that this invention has provided a greatly improved break-away type fastening means. While the device has been described as constituting a chain with a rod-like member forming the second coupling means in cooperation with a ring 11 forming the first coupling means, it should be understood that different configurations could be employed to perform equivalent functions. Further, it should be understood that any suitable material such as plastic could be used to form the collar and couplings. The invention therefore is not to be thought of as limited to the particular embodiment set forth for illustrative purposes.

What is claimed is:

1. A safety fastening comprising: a flexible line terminating in a first coupling means at one end and a second coupling means at its other end, said first coupling means comprising a closed ring of given internal diameter, and said second coupling means comprising a rod having its intermediate portion formed into a spiral and its ends extending substantially tangentially from circumferentially spaced points of said spiral and diverging from each other to define arms, the ends of said arms being spaced apart a distance greater than said internal diameter of said ring and adapted to be biased towards each other to decrease their separation to a distance less than said internal diameter without exceeding the elastic limit of said spiral, whereby said arms can be biased to pass entirely through said ring and then released to couple said ends of said line together.

2. The subject matter of claim 1, in which the outer diameter of said spiral is less than the internal diameter of said ring so that one of said arms may initially be passed through said ring, followed by said spiral and then followed by the other of said arms, after suitable rotation of said spiral and arms about the axis of said spiral, to thread said spiral and arms through said ring without elastically deforming the same.

3. The subject matter of claim 2, in which said spiral and arms may be pulled to pull portions of said flexible means through said closed ring thereby providing a choke collar.

References Cited in the file of this patent

UNITED STATES PATENTS

| | | |
|---|---|---|
| 59,276 | Sawyer | Oct. 30, 1866 |
| 2,612,139 | Collins | Sept. 30, 1952 |
| 2,743,702 | Sullivan | May 1, 1956 |

FOREIGN PATENTS

| | | |
|---|---|---|
| 366,263 | France | Oct. 1, 1906 |